United States Patent Office 2,918,488
Patented Dec. 22, 1959

2,918,488
PHOSPHONIC ACID ESTERS AND A PROCESS FOR THEIR PRODUCTION

Gerhard Schrader, Wuppertal-Cronenberg, Germany, assignor to Farbenfabriken Bayer Aktiengesellschaft, Leverkusen, Germany, a corporation of Germany No Drawing. Application October 27, 1958
Serial No. 769,593

Claims priority, application Germany November 2, 1957

12 Claims. (Cl. 260—461)

The present invention relates to and has as its objects new and useful insecticidal phosphonic acid esters and a process for their manufacture. Generally the new compounds of this invention may be represented by the following formula

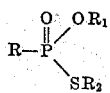

in which R stands for cyclo alkyl or eventually substituted vinyl radicals, $R_1$ stands for a preferably lower alkyl radical up to 4 carbon atoms, and $R_2$ stands for substituted mercapto or substituted amino alkyl radicals.

According to a preferred method the compounds of the present invention may be prepared by reacting salts of the corresponding thiolphosphonic acid esters with corresponding substituted alkyl halides as it is to be seen from the following formulae:

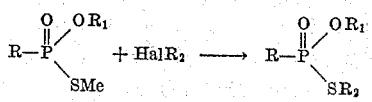

In these formulae the symbols have the same significance as shown above. Me stands for a salt-forming radical, and Hal stands for preferably chlorine or bromine. The thiolphosphonic acid ester salts are prepared by saponifying the corresponding thionophosphonic acid ester chlorides, preferably with potassium hydroxide solution: the resulting thiono acid then reacts in the tautomeric thiolform as shown in the above equation.

The reaction generally has to be carried out in suitable inert solvents and at slightly elevated temperatures up to about 100° C. Suitable inert solvents are especially lower alcohols, such as methanol, ethanol, propanol, and the like, or lower aliphatic ketones, especially acetone or methyl ethyl ketone.

The new esters of the present invention are likewise excellent pest control agents having chiefly an insecticidal action. The new compounds are applied in the manner known for other phosphoric acid ester insecticides, i.e. preferably in combination with liquid or solid diluting or extending agents. Water is chiefly to be considered as a liquid diluting agent, and this in combination with suitable commercial emulsifiers and with the addition of dissolving agents such as dimethylformamide or acetone. Said diluting or extending agents are chiefly talc, chalk, charcoal or carbon black. If desired, these may also be used with emulsifiers, in order to enable the manufacture of the so-called "slurry preparations."

To demonstrate the special utility of the inventive compounds the compounds of the following formulae have been tested against caterpillars:

(I)
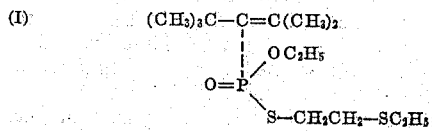

(II)
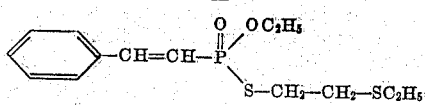

Aqueous solutions of the aforementioned compounds have been prepared by admixing them with the same amount of an auxiliary solvent (acetone). A commercial emulsifier (benzyl hydroxy diphenyl polyglycol ether) is added in an amount of 20% referred to active ingredient. This premixture then is diluted with water to the desired concentration. The test has been carried out as follows: against caterpillars of the type diamond back moth (*Plutella maculipennis*): white cabbage has been sprayed drip wet with aqueous emulsions as prepared above in a concentration as shown below. Caterpillars (10 each) have been placed on the sprayed leaves of the white cabbage. The living status has been determined after 24 hours and 48 hours. The results are to be seen from the following table:

| compound | solution | killing rate |
|---|---|---|
|  | *Percent* | *Percent* |
| (I) | 0.01 | 100 |
| (II) | 0.1 | 100 |

The following examples are given for the purpose of illustrating the invention.

Example 1

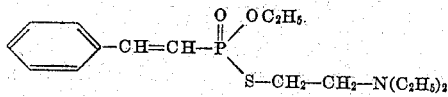

64 grams of styryl-thionophosphonic acid ethyl ester chloride are dissolved in 130 millilitres of anhydrous alcohol. 30 millilitres of water are added thereto and then 29 grams of potassium hydroxide dissolved in 60 millilitres of water. The temperature rises to 70° C. The mixture is kept with stirring at 70° C. for a further 2 hours, and 36 grams of diethylamino-ethyl chloride are then added. The temperature is maintained at 70–80° C. for a further 3 hours while stirring is continued and the mixture is then cooled to room temperature. After working up as usual, 47 grams of the new ester are obtained as a water-insoluble yellow oil. Yield: 58% of the theoretical.

The new ester shows a mean toxicity of 10 mg./kg. on rats per os.

Example 2

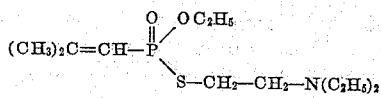

51 grams of isobutenyl-thionophosphonic acid ethyl ester chloride are dissolved in 130 millilitres of anhydrous alcohol. 30 millilitres of water are added thereto and then a solution of 29 grams of potassium hydroxide in 60 millilitres of water. The temperature rises spontaneously to 70° C. The mixture is then kept at 70° C. for a further 2 hours and 36 grams of diethylamino-ethyl chloride are then added dropwise with further stirring. The product is kept at 70° C. for a further 2 hours and then worked up as usual. 42 grams of the new ester are thus obtained as a colorless sparingly water-soluble oil of B.P. 96° C./0.01 mm. Hg. Yield: 60% of the theoretical.

Example 3

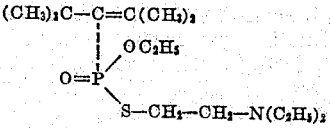

65 grams of diisobutenyl-thionophosphonic acid ethyl ester chloride are dissolved in 130 millilitres of anhydrous alcohol. 30 millilitres of water are added thereto and then a solution of 29 grams of potassium hydroxide in 60 millilitres of water while stirring. The temperature rises spontaneously to 70° C. The mixture is heated to 70–75° C. for a further 2 hours and 36 grams of diethylamino-ethyl chloride are then added dropwise with further stirring. The reaction product is then kept at 50–60° C. for another 3 hours, cooled and worked up in usual manner. 42 grams of the new ester are thus obtained as a pale yellow water-insoluble oil. Yield: 50% of the theoretical.

Aphids are completely killed with 0.01% concentrations of this ester.

Example 4

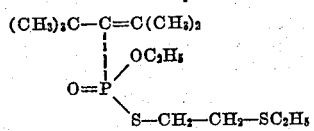

65 grams of diisobutenyl-thionophosphonic acid ethyl ester chloride are dissolved in 130 millilitres of anhydrous alcohol. 30 millilitres of water are added thereto and then a solution of 29 grams of potassium hydroxide in 60 millilitres of water. The temperature rises to 60° C. The mixture is heated to 70–75° C. with continued stirring for 2 hours and 32 grams of β-ethylmercapto-thioethylether (B.P. 48° C./12 mm. Hg) are then added at the said temperature. The temperature is maintained at 75° C. for a further 3 hours and the product then worked up in usual manner. 55 grams of the new ester of B.P. 100° C./0.01 mm. Hg are thus obtained. Yield: 68% of the theoretical. The ester is water-insoluble. Caterpillars are completely killed by the ester at a concentration of 0.01%.

Example 5

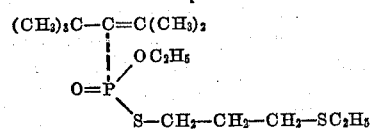

65 grams of diisobutenyl-thionophosphonic acid ethyl ehter chloride are dissolved in 130 millilitres of anhydrous alcohol. 30 millilitres of water are added thereto and then a potassium hydroxide solution from 29 grams of potassium hydroxide in 60 millilitres of water. The mixture is heated to 70° C. for 2 hours and 50 grams of γ-bromopropyl-thioethyl ether (B.P. 78° C./12 mm. Hg) are then added dropwise with stirring. The product is kept at 75° C. for a further 4 hours and then worked up in usual manner. 44 grams of the new ester of B.P. 114° C./0.01 mm. Hg are thus obtained as a colorless water-insoluble oil. Yield: 53% of the theoretical.

Aphids are completely killed with 0.01% solutions.

Example 6

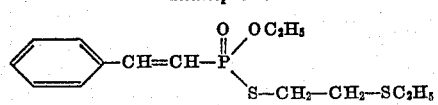

64 grams of styryl-thionophosphonic acid ethyl ester chloride (B.P. 97° C./0.01 mm. Hg) are dissolved in 130 millilitres of anhydrous alcohol. 30 millilitres of water are added thereto and then a solution of 29 grams of potassium hydroxide in 60 millilitres of water. The mixture is heated to 75° C. for 2 hours and 32 grams of β-chlorethyl-thioethyl ether are then added dropwise. The product is heated to 75° C. for a further 3 hours and then worked up in usual manner. 63 grams of the new ester of B.P. 134° C./0.01 mm. Hg are thus obtained. Yield: 80% of the theoretical. Caterpillars are completely killed with 0.1% solutions.

Example 7

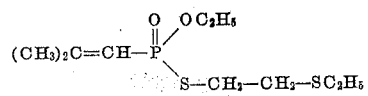

51 grams of isobutenyl-thionophosphonic acid ethyl ester chloride are dissolved in 130 millilitres of anhydrous alcohol. 30 millilitres of water are added thereto and then a potassium hydroxide solution from 29 grams of potassium hydroxide in 60 millilitres of water. The mixture is heated with further stirring to 75° C. and 32 grams of β-chlorethyl-thioethyl-ether are then added dropwise. The reaction product is then kept at 75° C. with further stirring for a further 2 hours and then worked up in usual manner. 40 grams of the new ester of B.P. 88° C./0.01 mm. Hg are thus obtained.

As a concentration of 0.1% the preparation has a marked systemic action on aphids.

Example 8

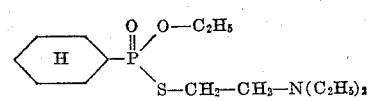

35 grams of β-diethylamino-ethylmercaptan are dissolved in 100 millilitres of methyl ethyl ketone. A sodium ethylate solution containing ¼ mol of dissolved sodium is added thereto at 30° C. The mixture is after-stirred at room temperature for a half hour and 53 grams of cyclohexyl-phosphonic acid ethyl ester chloride are then added dropwise at the said temperature. The mixture is kept at 30° C. for another hour, diluted with 300 millilitres of benzene and shaken with 100 millilitres of water. The benzenic solution is dried over sodium sulfate. The solvent is subsequently removed under vacuum (bath temperature: 100° C., pressure: 0.01 mm. Hg). 40 grams of the new ester are thus obtained as a yellow water-insoluble liquor.

Example 9

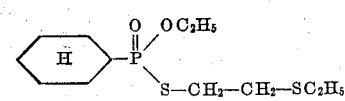

21 grams of β-ethylmercapto-thioethyl-ether (B.P. 67° C./12 mm. Hg) are dissolved in 120 millilitres of ethyl methyl ketone. A sodium ethylate solution containing ⅙ mol of dissolved sodium is added at 30° C. The mixture is after-stirred at 30° C. for a half hour and 36 grams of cyclohexyl-phosphonic acid ethyl ester chloride (B.P. 115° C./1 mm. Hg) are then added at the said temperature. The reaction product is heated to 30–40° C. for another hour, then poured into a large amount of water and the separated oil is taken up with benzene. After working up as usual 32 grams of the new ester of B.P. 118° C./0.01 mm. Hg are obtained. Yield: 65% of the theoretical. The ester is a colorless water-insoluble oil.

Example 10

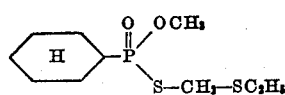

22 grams of α-mercaptomethyl-thioethyl ether are dissolved in 100 millilitres of benzene. 5 grams of sodium powder are added thereto and the mixture is briefly heated to 50° C. in a nitrogen atmosphere. The sodium is then dissolved. 38 grams of cyclohexyl-phosphonic acid methyl ester chloride are thereupon added dropwise with further stirring at 50° C. and the mixture is heated to 50° C. for another hour. It is then diluted with 300 millilitres of benzene and washed with 150 millilitres of water. After drying the benzenic solution over sodium sulfate, the filtrate is fractionated. 37 grams of the new ester of B.P. 110° C./0.01 mm. Hg are thus obtained. The ester is a pale yellow water-insoluble oil.

I claim:

1. Phosphonic acid esters of the following formula

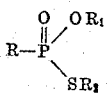

in which R stands for a member selected from the group consisting of cyclohexyl, phenyl-substituted vinyl and lower alkyl-substituted vinyl, wherein the lower alkyl radical has up to 4 carbon atoms, $R_1$ stands for a lower alkyl radical up to 4 carbon atoms, and $R_2$ stands for a member selected from the group consisting of a lower alkyl mercapto-substituted lower alkylene radical and a lower alkyl-substituted secondary amino lower alkylene radical, in which the lower alkyl and alkylene radicals have up to 4 carbon atoms.

2. The phosphonic acid ester of the following formula

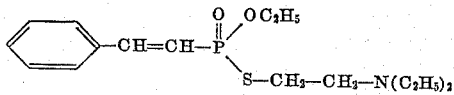

3. The phosphonic acid ester of the following formula

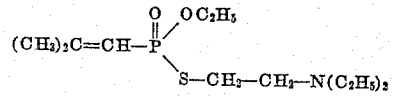

4. The phosphonic acid ester of the following formula

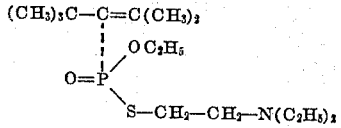

5. The phosphonic acid ester of the following formula

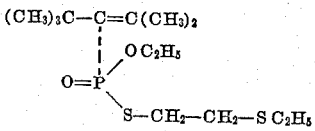

6. The phosphonic acid ester of the following formula

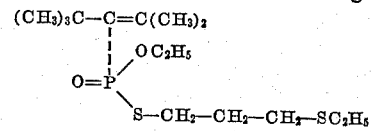

7. The phosphonic acid ester of the following formula

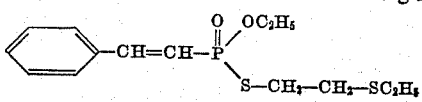

8. The phosphonic acid ester of the following formula

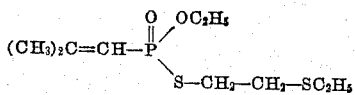

9. The phosphonic acid ester of the following formula

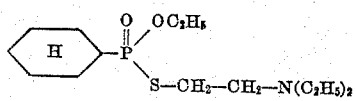

10. The phosphonic acid ester of the following formula

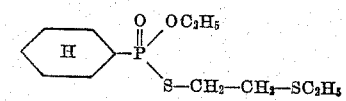

11. The phosphonic acid ester of the following formula

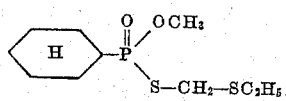

12. A process for the preparation of phosphonic acid esters of the following formula

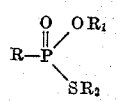

in which R stands for a member selected from the group consisting of cyclohexyl, phenyl-substituted vinyl and lower alkyl-substituted vinyl, wherein the lower alkyl radical has up to 4 carbon atoms, $R_1$ stands for a lower alkyl radical up to 4 carbon atoms, and $R_2$ stands for a member selected from the group consisting of a lower alkyl mercapto-substituted lower alkylene radical and a lower alkyl-substituted secondary amino lower alkylene radical, in which the lower alkyl and alkylene radicals have up to 4 carbon atoms, which comprises saponifying a thionophosphonic acid ester chloride of the following formula

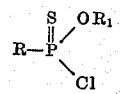

(in which R and $R_1$ have the same significance as given above) with potassium hydroxide and further reacting the thiolphosphonic acid ester potassium salt with an alkyl chloride of the following formula

(in which $R_2$ has the same significance as given above).

No references cited.